United States Patent
Massari et al.

(10) Patent No.: US 11,312,579 B2
(45) Date of Patent: Apr. 26, 2022

(54) DEVICE FOR THE ORIENTATION AND FEEDING OF CLOSURES

(71) Applicant: SACMI BEVERAGE S.P.A., Imola (IT)

(72) Inventors: Mirco Massari, Parma (IT); Giampaolo Benvenuti, Parma (IT)

(73) Assignee: SACMI BEVERAGE S.P.A., Imola (IT)

( * ) Notice: Subject to any disclaimer, the term of this patent is extended or adjusted under 35 U.S.C. 154(b) by 0 days.

(21) Appl. No.: 17/218,796

(22) Filed: Mar. 31, 2021

(65) Prior Publication Data
US 2021/0309463 A1    Oct. 7, 2021

(30) Foreign Application Priority Data

Apr. 2, 2020 (IT) .................. 102020000006958

(51) Int. Cl.
*B65G 47/24* (2006.01)
*B65G 47/14* (2006.01)
*B67B 3/064* (2006.01)

(52) U.S. Cl.
CPC ............. *B65G 47/24* (2013.01); *B65G 47/14* (2013.01); *B65G 47/1478* (2013.01); *B67B 3/064* (2013.01)

(58) Field of Classification Search
CPC .... B65G 47/24; B65G 47/256; B65G 47/248; B65G 47/1478; B65G 47/1407; B65G 47/14; B67B 3/064
USPC ........................................... 198/396, 397.07
See application file for complete search history.

(56) References Cited

U.S. PATENT DOCUMENTS

| | | | | |
|---|---|---|---|---|
| 2,651,402 A * | 9/1953 | Noyes | ............... | B65G 47/1471 198/398 |
| 2,863,588 A * | 12/1958 | Stover | .................... | B65B 35/56 198/443 |
| 4,281,758 A * | 8/1981 | Adamski | .............. | B65G 47/256 193/45 |
| 4,879,025 A | 11/1989 | Shapcott | | |
| 5,333,718 A * | 8/1994 | Pannell | .............. | B65G 47/1471 198/396 |
| 5,464,089 A | 11/1995 | Shapcott | | |
| 5,586,637 A * | 12/1996 | Aidlin | ................ | B65G 47/1471 198/396 |
| 6,491,152 B1 * | 12/2002 | Evers, Jr. | ........... | B65G 47/1471 198/393 |
| 7,743,904 B2 * | 6/2010 | Monti | ................ | B65G 47/1471 198/396 |
| 2005/0077216 A1 | 4/2005 | Zemlin et al. | | |

FOREIGN PATENT DOCUMENTS

WO    2015125161 A1    8/2015

OTHER PUBLICATIONS

IT Search Report dated Dec. 21, 2020 re: Application No. IT 202000006958, citting: WO 2015/125161 A1, US 5 464 089 A, US 4 879 025 A, and US 2005/0077216 A.

* cited by examiner

*Primary Examiner* — James R Bidwell
(74) *Attorney, Agent, or Firm* — Cantor Colburn LLP (57) ABSTRACT

A device for the orientation and feeding of closures includes a hopper for containing closures and a lifting device. The lifting device includes a component used for selecting the closures which are adapted to allow the feeding to an unloading region of the closures. The lifting device includes at least one transfer element to move along a movement direction between a loading region and an unloading region.

10 Claims, 9 Drawing Sheets

DEVICE FOR THE ORIENTATION AND FEEDING OF CLOSURES

CROSS-REFERENCE TO RELATED APPLICATIONS

This application is related to and claims the benefit of Italian Patent Application No. 102020000006958, filed on Apr. 2, 2020, the contents of which are herein incorporated by reference in their entirety.

TECHNICAL FIELD

The present disclosure relates to a device for the orientation and feeding of closures.

BACKGROUND

Devices for the orientation and feeding of closures are known which are designed to pick up closures from a containment hopper in order to feed them, by means of a transfer device provided with at least one transfer portion with linear extension, to a star conveyor for feeding to a capping device.

Typically, lifting means are arranged between the containment hopper and the transfer device and are adapted to pick up the closures from the bottom of the hopper to provide them to the feeder with linear extension which has a feeding end arranged at a greater height than the bottom of the hopper.

Solutions are known which provide for a feeder for a capping unit for bottles which comprises a hopper for containing the closures and a conveyor designed to convey the closures along a lifting structure toward a feeding chute, which is arranged transversely to the conveyor, so that the lifting structure is adjusted angularly so that the closures of the bottles that are oriented incorrectly fall onto the bottom of the conveyor.

Furthermore, the feeder is provided with a flow control bar which is designed to force the closures that are correctly oriented so that they are unloaded into the chute and then fed to the capping unit.

Many known solutions provide for the transfer of the closures, during lifting or, once the maximum height has been reached, during the first transfer step, to occur while keeping said closures on their side.

Although this in a way limits the risk of jamming, on the other hand it causes the need to subsequently handle the closures to move them into the condition in which they rest on their lower rim, so that they can be screwed on by the capping machine.

A rather common problem of known devices is in any case the one related to the unloading of any jammed closures (malfunctions which are spontaneous or due to the presence of foreign objects or due to deformed or defective closures), especially when the closures are arranged so as to rest on their lower rim.

SUMMARY

The aim of the present disclosure is to provide a device for the orientation and feeding of closures that is capable of improving the background art in one or more of the aspects indicated above.

Within this aim, the disclosure provides a device for the orientation and feeding of closures that allows easy removal of jammed closures and at the same time makes it possible to feed with continuity a capping machine without the need to have a closure buffer or a redundant feeding system.

The disclosure devises a device for the orientation and feeding of closures that is extremely compact and adapted to effectively verify the shape of said closures.

The disclosure provides a device for the orientation and feeding of closures that is highly reliable, relatively easy to provide and has competitive costs.

This aim, as well as these and other advantages which will become more apparent hereinafter, are achieved by providing a device for the orientation and feeding of closures according to claim 1, optionally provided with one or more of the characteristics of the dependent claims.

BRIEF DESCRIPTION OF THE DRAWINGS

Further characteristics and advantages of the disclosure will become more apparent from the description of some preferred but not exclusive embodiments of a device for the orientation and feeding of closures according to the disclosure, illustrated by way of nonlimiting example in the accompanying drawings, wherein.

DETAILED DESCRIPTION OF THE DRAWINGS

With reference to the figures, the device for the orientation and feeding of closures according to the disclosure, designated generally by the reference numeral 1, comprises a hopper 2 for containing closures 10 and a device 3 for lifting the closures 10 which comprises at least one transfer element 4 which can move along a movement direction 100 between a loading region 30, designed to receive the closures 10 that arrive from the containment hopper 2, and an unloading region 31, which is arranged at a greater height than the loading region 30.

The transfer element 4 has a closed extension which forms a rising portion, which extends from the loading region 30 to the unloading region 31, and a descending portion, which extends from the unloading region 31 to the loading region 30.

The transfer element 4 has, along its extension, a plurality of receptacles 20 for the closures 10, which are formed between abutment walls 21 which are extended transversely with respect to the movement direction 100.

The lifting device 3 comprises means for selecting the closures 10, which are adapted to allow the feeding to the unloading region 31 of the closures 10 accommodated in the receptacles 20 with their lower rim 10a directed oppositely with respect to the transfer element 4.

With reference to the embodiment shown in the figures, the selection means comprise, along the rising portion of the lifting device 3, at least one evacuation portion 9 which has an increased slope which is adapted to cause the fall of the closures 10 accommodated in the receptacles 20 with their lower rim 10a directed toward the transfer element 4.

Conveniently, the evacuation portion 9 is provided by using a ratchet which has a portion that protrudes externally with respect to the inclination ramp of the rising portion.

In practice, the center of gravity of the closures 10 the lower rim 10a of which rests on the transfer element 4 is arranged so that when they transit through the evacuation portion 9 they fall downward so as to return again to the loading region 30.

The closures 10 the top 10b of which is instead directed toward the transfer element 4 have a center of gravity which is closer to the transfer element 10 and therefore able to travel beyond the evacuation portion 9.

In practice, the closures 10, when they are conveyed along the lifting device 3, are oriented substantially correctly by gravity. The optional presence of the "hump" formed at the evacuation portion 9 causes the backward fall of the minimal percentage of closures 10 that is not oriented correctly.

According to the present disclosure, the transfer device 1 comprises, at the unloading region 31, a device 40 for overturning the closures 10.

The overturning device 40 comprises an abutment partition 41 which is arranged substantially in parallel to the transfer element 4 in order to move the closures 10 into a feeding position in which the lower rim 10a is arranged downward.

Conveniently, the abutment partition 41 is extended at the passage region between the rising portion and the descending portion.

The abutment partition 41 has a lower interruption end which is extended substantially horizontally.

The transfer device 1 comprises at least one guide 50 for feeding the closures 10 in the feeding position from the unloading region 31 toward a feeding element 61 which is associated with a capping unit 60.

Preferably, the feeding element 61 comprises a feeding star conveyor.

The device 1 comprises at least one blower 80, which is adapted to move the closures 10 from the unloading region 31 along the feeding guide 50.

An unjamming portion 32 is arranged along the feeding guide 50.

The unjamming portion 32 comprises a lower supporting surface 33 and two lateral containment walls 34, 35 for the closures 10 that arrive from the unloading region 31.

There is also an unjamming device 110 for the removal of the closures 10 that are jammed at the unjamming portion 32.

The unjamming device 110 comprises sensor means, not shown, which are arranged downstream of the unloading region 31 and are adapted to detect an interruption of the flow of the closures 10 along the feeding guide 50.

Preferably, the unjamming device 110 is provided with a plurality of sensor means which are arranged so as to be mutually spaced along the extension of the feeding guide 50 so as to be able to identify any jams more rapidly.

Furthermore, the unjamming device 110 is provided with actuation means 33a, which are adapted to move at least one portion of the lower supporting surface 33 in response to a signal emitted by the sensor means in order to cause the fall by gravity of the jammed closures 10 from the supporting surface 33.

Specifically, the fall of the closures 10 is facilitated by the action of the blower 80 for moving the closures 10.

Preferably, the actuation means 33a comprise actuator means which are adapted to cause a movement of the lower supporting surface 33 along a movement direction which is substantially horizontal and perpendicular to the direction of extension of the feeding guide 50.

Of course, nothing forbids providing a different method for the movement of the lower supporting surface 33, for example by tilting about a longitudinal edge thereof.

Preferably, the actuation means comprise first actuation means 33a, which are adapted to move at least one portion of the lower supporting surface 33, and second actuation means 35a, which are adapted to move at least one portion of at least one lateral containment wall 35 in response to a signal emitted by the sensor means in order to cause the fall by gravity of the jammed closures 10 from the supporting surface 33.

The second actuation means 35a, in particular, comprise actuator means adapted to cause a movement of the lateral containment wall 35 along a movement direction that is substantially horizontal and perpendicular to the direction of extension of the feeding guide 50, away from the other containment wall 34.

According to a preferred embodiment, the unjamming portion 32 is arranged directly downstream of the unloading region 31.

This is in fact the region most subjected to any jamming.

Conveniently, it is possible to provide an unloading device which comprises means for moving on command the lower surface of the overturning device 40.

These movement means operate under automated control, or manually, if an interruption of the flow of the closures 10 is detected which has not been solved by the intervention of the unjamming device 110, and in particular by the movement of the lower supporting surface 33.

Conveniently, the device 1 has, along the extension of the feeding guide 50, an inspection station 70.

The inspection station 70, substantially of unknown type, is designed to verify the conformity of the closures 10.

In particular, the inspection station 70 is functionally associated with a device for expelling nonconforming closures 10.

Figure 1:
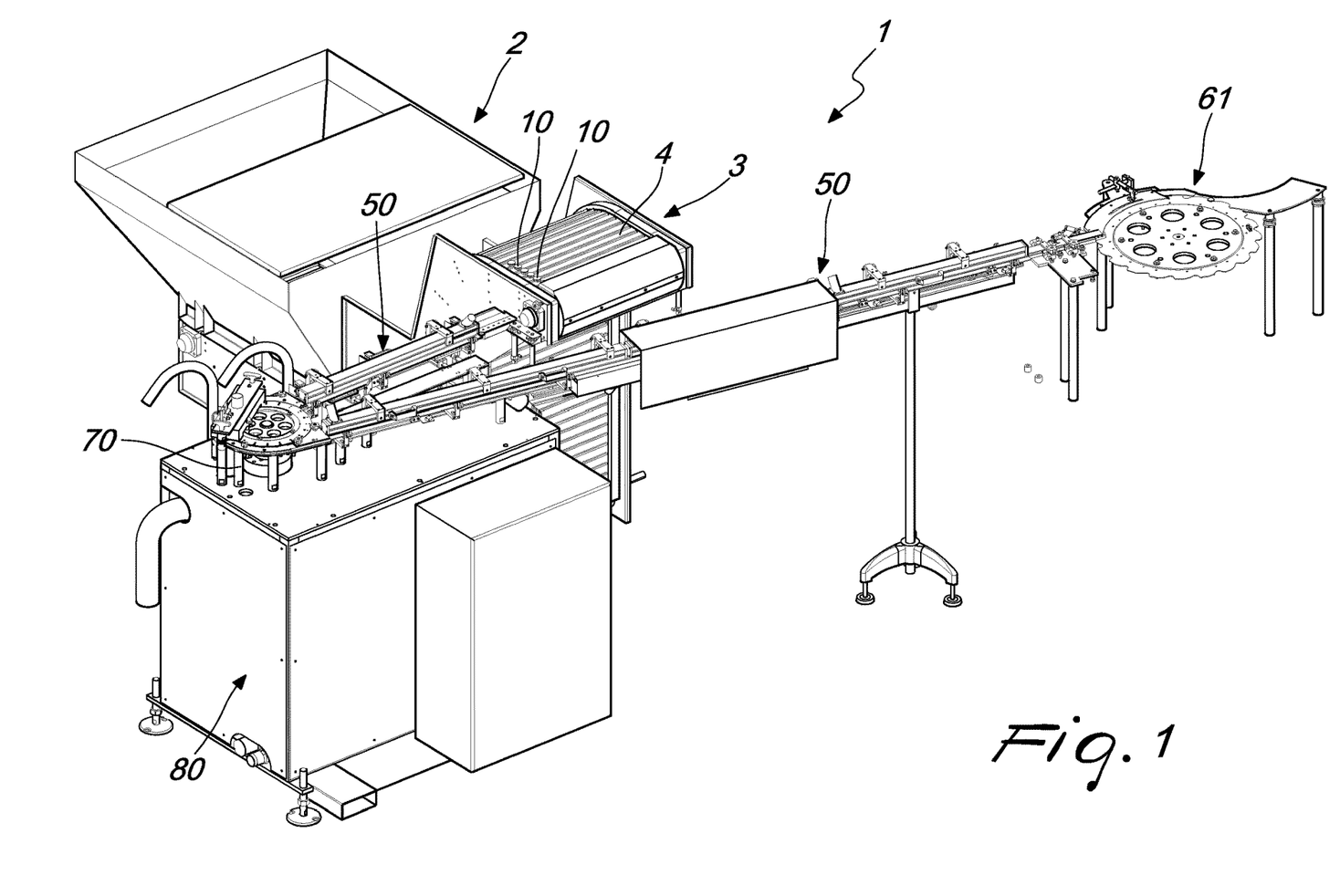
FIG. 1 is a perspective view of the device for the orientation and feeding of closures according to the disclosure.
Figure 2:
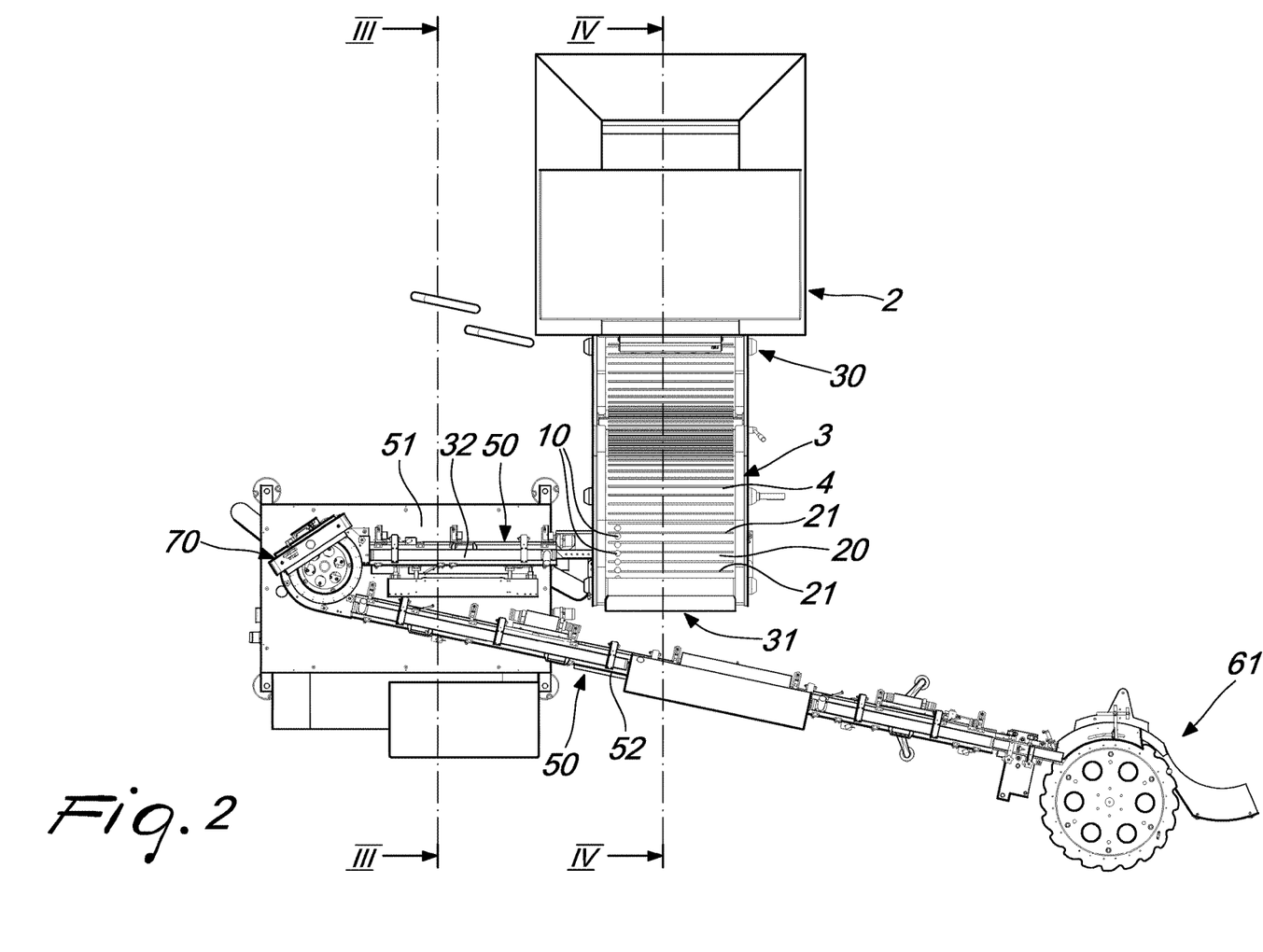
FIG. 2 is a top view of the device for the orientation and feeding of closures of FIG. 1.
Figure 3:
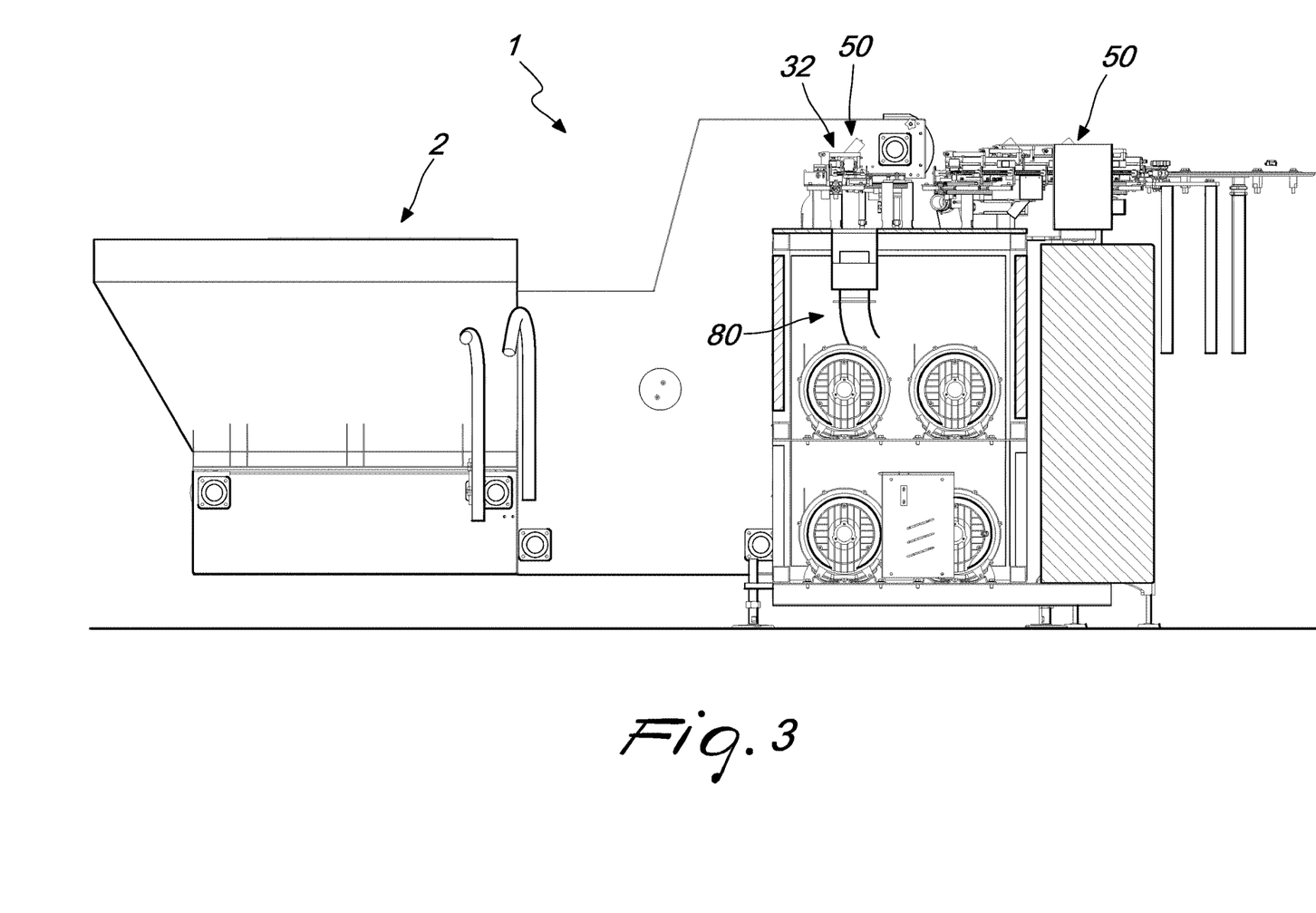
FIG. 3 is a sectional view of the device for the orientation and feeding of closures, taken along the plane of arrangement defined by the line III-III of FIG. 2.
Figure 4:
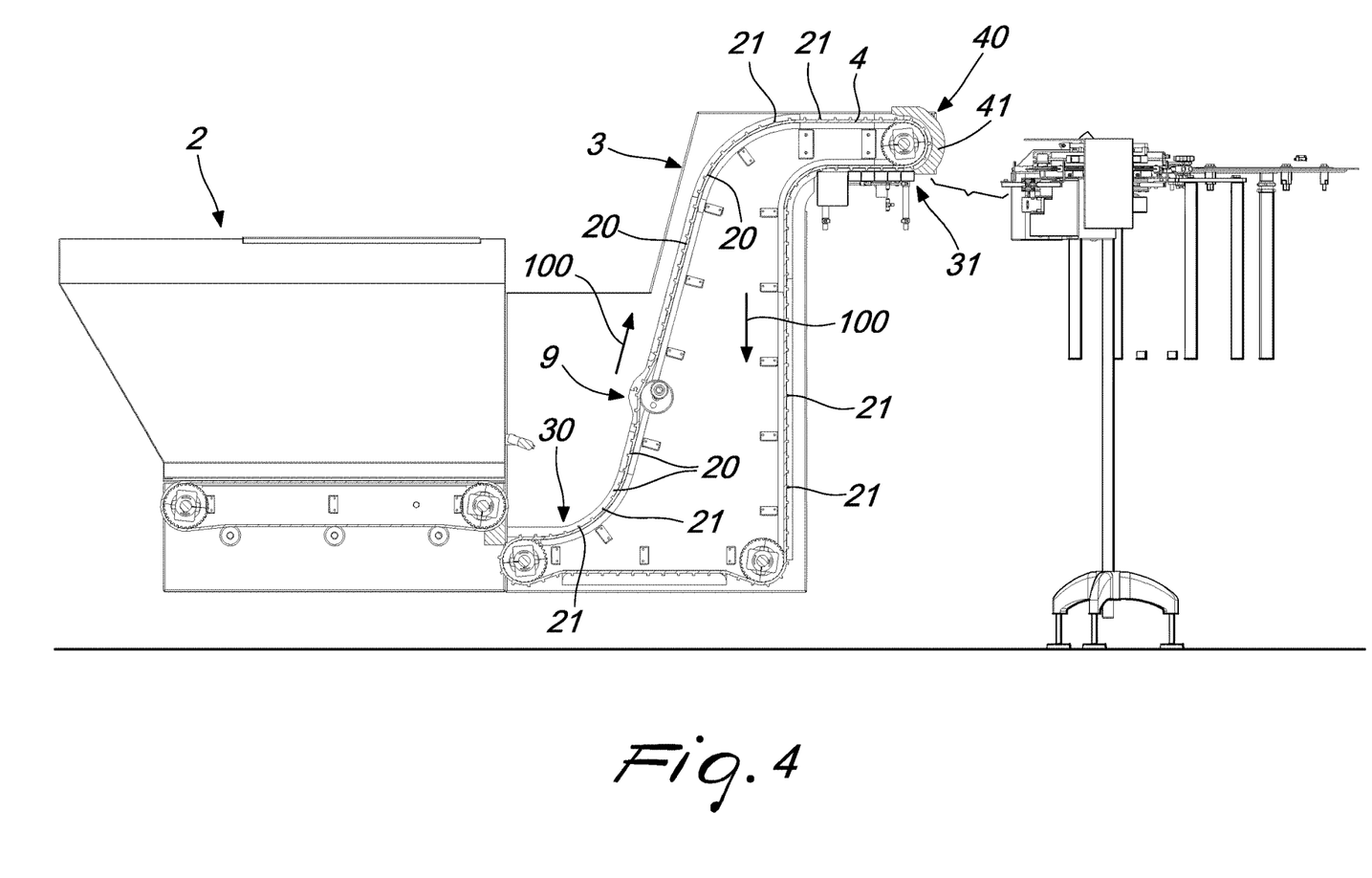
FIG. 4 is a sectional view of the device for the orientation and feeding of closures, taken along the plane of arrangement defined by the line IV-IV of FIG. 2.
Figure 5:
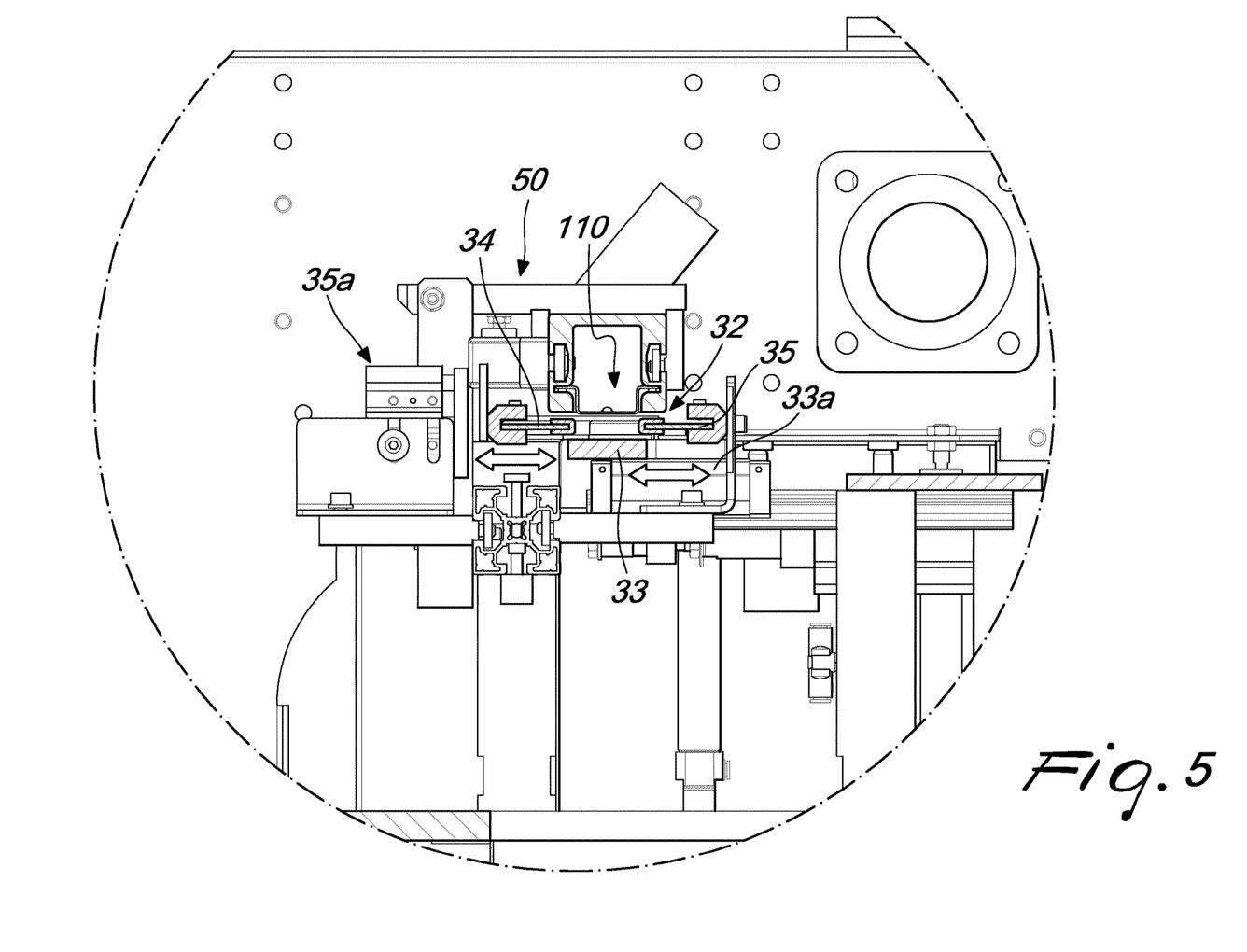
FIG. 5 is an enlarged-scale view of a portion of FIG. 3.
Figure 6:
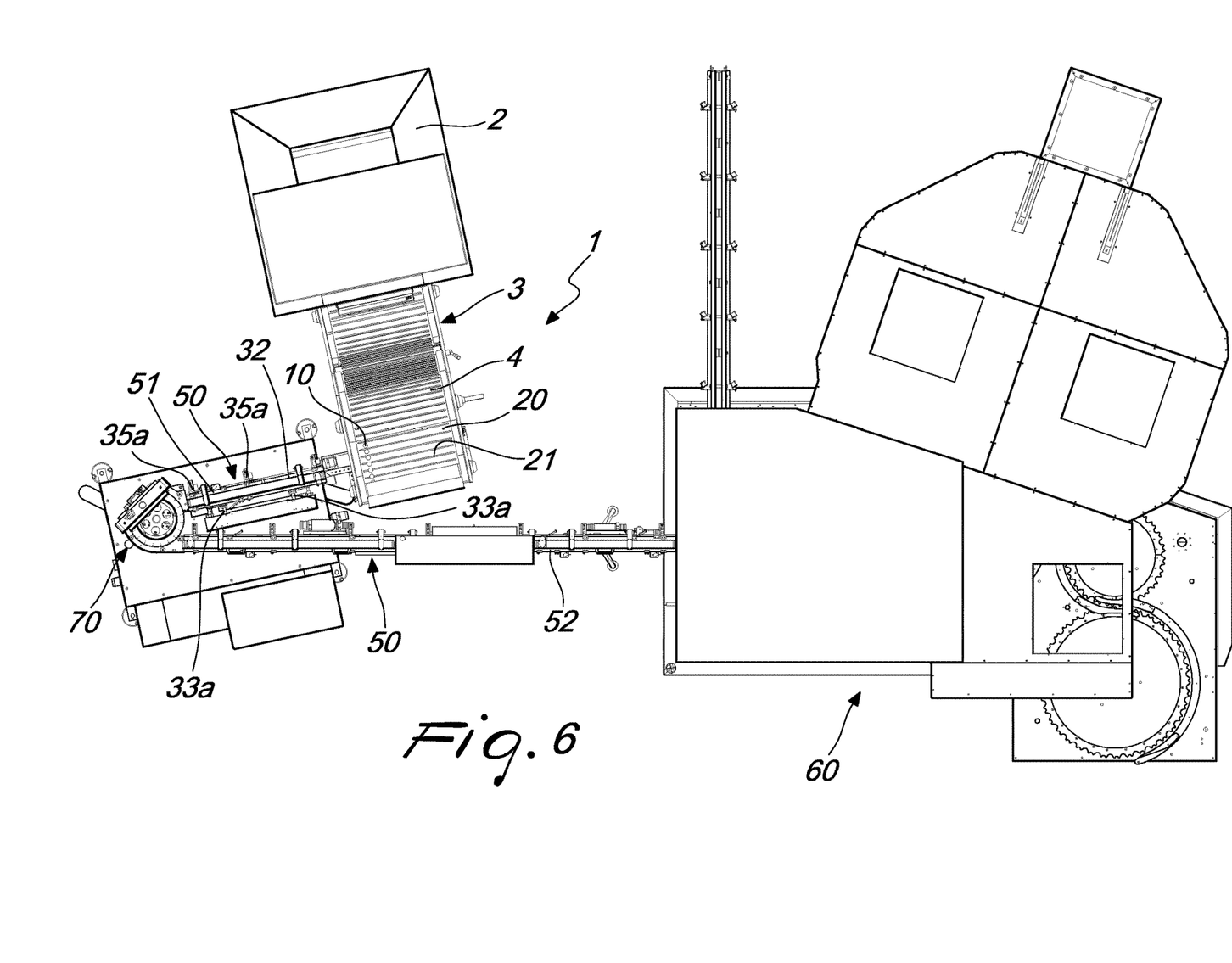
FIG. 6 is a top view of a capping system associated with the device for the orientation and feeding of closures according to the disclosure.
Figure 7:
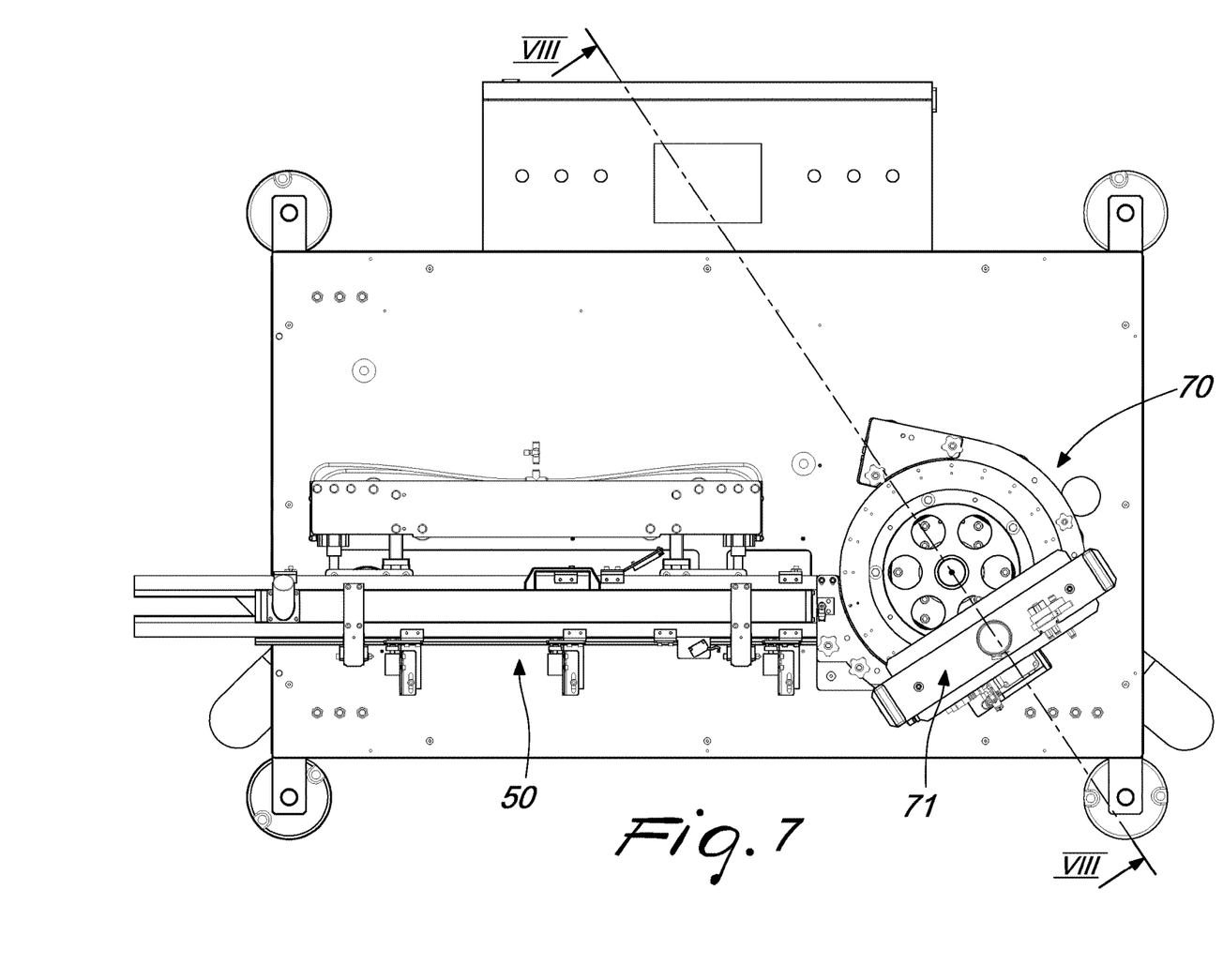
FIG. 7 is a top view of a portion of the orientation device at the inspection station.
Figure 8:
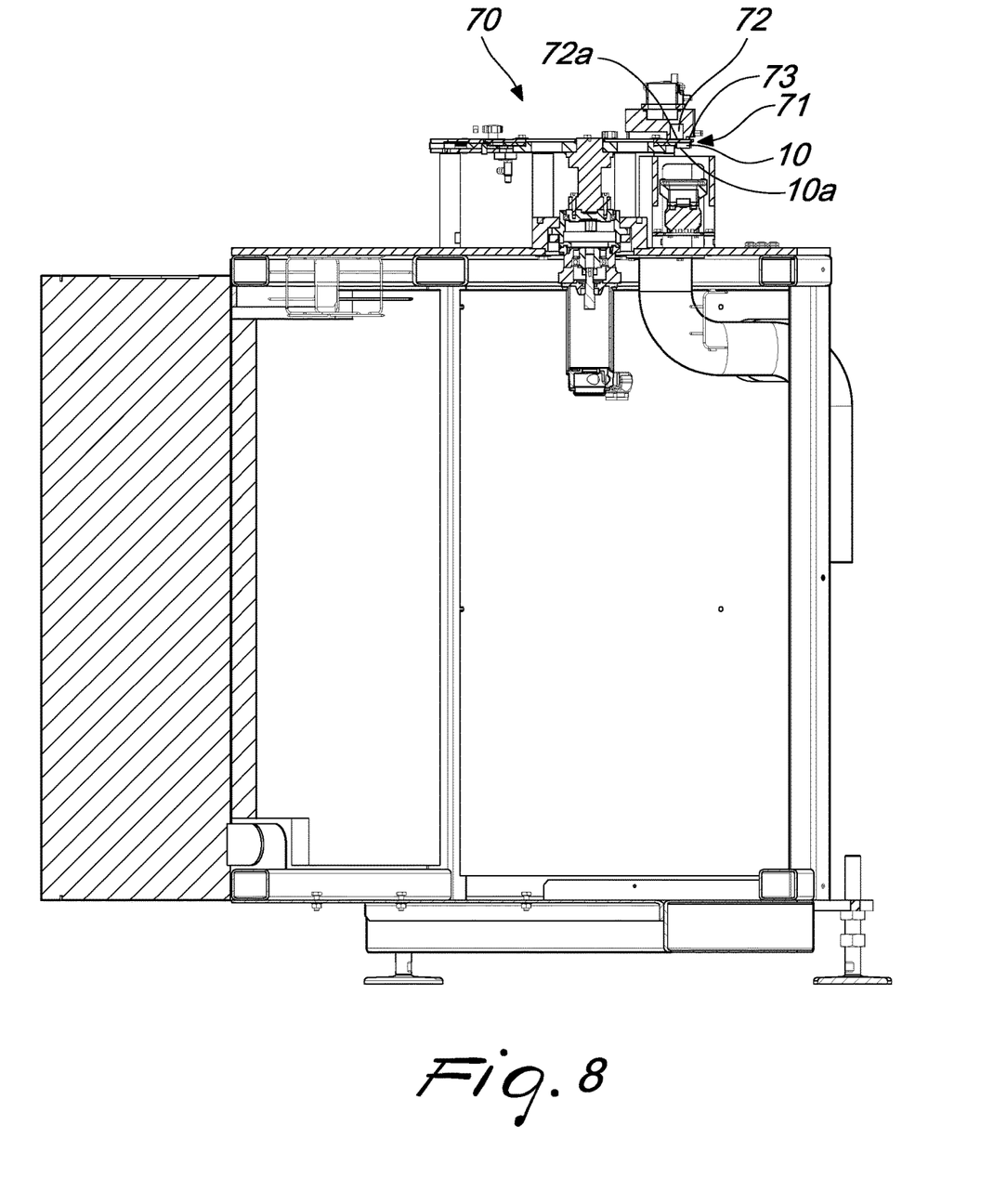
FIG. 8 is a sectional view of the portion of the device of FIG. 7, taken along the plane of arrangement defined by the line VIII-VIII of FIG. 7.
Figure 9:
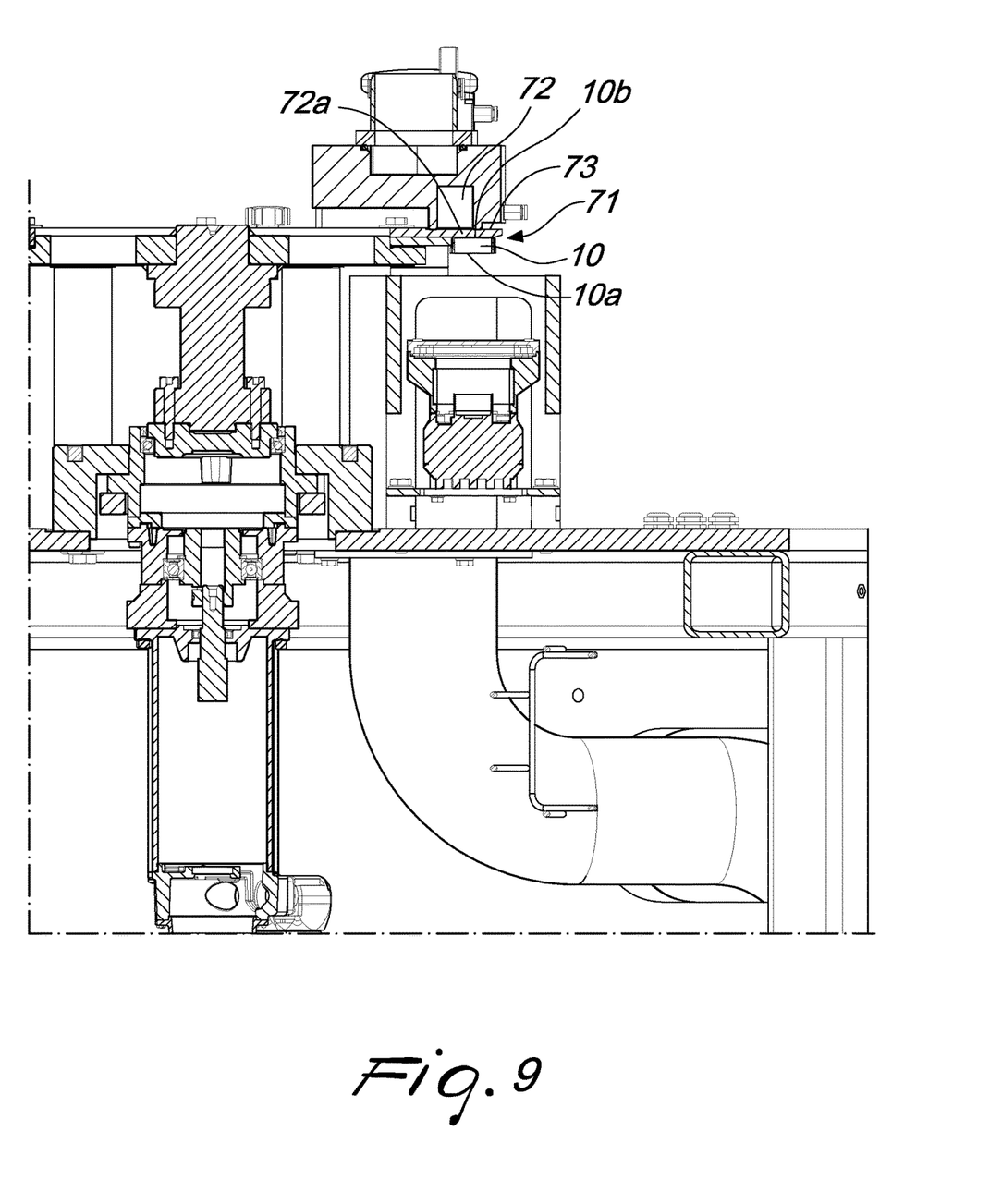
FIG. 9 is an enlarged-scale view of a portion of the cross-section of FIG. 7.

With reference to the practical embodiment shown in the figures, and in particular in FIGS. 7 to 9, the inspection station 70 comprises a device 71 for lifting the closures 10 which is adapted to keep the lower rim 10a of the lifted closures 10 so as to allow adapted vision and control systems to verify the conformity of the closures 10.

Since the closures 10 transit along the feeding guide 50 with the lower rim 10a directed downward, in the inspection station 70 the closures must in fact be kept raised, i.e., not resting on the surface with their lower rim, so as to allow the inspection of their internal surface.

Conveniently, the lifting device 71 comprises a star conveyor along which multiple receptacles for respective closures 10 are formed.

The receptacles are connected, by means of at least one suction opening 72a, to a vacuum chamber 72, which is connected to air suction means.

Furthermore, the receptacles are associated with a device for expelling the nonconforming closures 10.

Such expulsion device can be provided by expulsion ducts 73, which are connected for example to a pressurized chamber, by means of an electric valve which can be activated on command if the vision and control systems verify the nonconformity of the closure 10.

Advantageously, the air suction means are functionally associated with the blower 80 designed to move the closures along the guide, thus providing a solution that is particularly efficient from the energy standpoint.

Preferably, the unjamming portion 32 is arranged between the unloading region 31 and the inspection station 70.

With reference to the embodiment shown in the figures, the feeding guide 50 comprises a first guide 51 and a second guide 52.

The inspection station 70, in this case, is formed at a star conveyor which is arranged between the first guide 51 and said second guide 52.

The first guide 51 and the second guide 52 are arranged substantially in parallel and the advancement direction of the closures is opposite so as to allow a reduction in space occupations.

Conveniently, the extension in length of the second guide 52 is the minimum necessary to cover the lack of closures during the unjamming cycle without the feeding element 61 remaining without closures 10.

The operation of the device 1 for the orientation and feeding of closures 10, according to the disclosure, is as follows.

The closures 10 are unloaded from the bottom of the containment hopper 2 at the loading region 30 of the transfer element 4.

The transfer element 4, typically constituted by a structure which is closed like a belt, moves along the movement direction 100 in order to move the closures toward the unloading region 31 through the rising portion.

The evacuation portion 9 is arranged along the rising portion and causes the falling toward the loading region 30 of the closures 10 that are not arranged correctly, i.e., of all the closures the lower rim 10a of which is directed toward the transfer element 4 itself.

The correctly positioned closures 10 are moved by the transfer element 4 to the unloading region 31, at which they are then turned over, moving their lower rim 10a so that it is directed downward.

The closures 10 are then fed to the feeding guide 50, where, by virtue of the action of the blower 80, they are pushed toward the feeding element 61.

During passage through the feeding guide 50, the closures 10 pass through the unjamming portion 32.

If the sensor means arranged downstream of the unloading region 31 detect an interruption of the flow of the closures 10 along the feeding guide 50, the actuation means 33a, adapted to move at least one portion of the lower supporting surface 33, and optionally the actuation means 35a, adapted to move the lateral containment wall 35, are activated, so as to cause the fall by gravity of the jammed closures 10 from the supporting surface 33.

In practice it has been found that the disclosure achieves the intended aim and objects, providing a highly reliable device in which the closure handling operations are extremely reduced, with a consequent reduction of machine downtime risks.

Furthermore, the known device solves in an extremely practical manner the possible problem of jams, which, indeed owing to its constructive structure, can in practice occur in an extremely limited region. The disclosure thus conceived is susceptible of numerous modifications and variations, all of which are within the scope of the appended claims; all the details may furthermore be replaced with other technically equivalent elements.

In practice, the materials used, as long as they are compatible with the specific use, as well as the contingent shapes and dimensions, may be any according to the requirements and the state of the art.

What is claimed is:

1. A device for the orientation and feeding of closures comprising: a hopper for containing closures, a lifting device for said closures which comprises at least one transfer element configured to move along a movement direction between a loading region and an unloading region, the loading region configured to receive the closures that arrive from said containment hopper, and the unloading region, arranged at a height that is higher than said loading region, said transfer element having a closed extension which forms a rising portion, which extends from the loading region to the unloading region, and a descending portion, which extends from said unloading region to said loading region, said transfer element having, along an extension thereof, a plurality of receptacles for said closures formed between abutment walls that are extended transversely to said movement direction, said lifting device comprising means for selecting the closures which are adapted to allow the feeding to said unloading region of the closures accommodated in said receptacles with their lower rim directed oppositely with respect to said transfer element, wherein said transfer device comprises, at said unloading region, an overturning device for turning over said closures which comprises an abutment partition arranged substantially in parallel to said transfer element to move said closures to a feeding position in which the lower rim is arranged downward, said transfer device comprising at least one feeding guide for feeding the closures in the feeding position from said unloading region toward a feeding element that is associated with a capping unit, at least one blower being provided which is adapted to move said closures from said unloading region along said feeding guide, along said feeding guide there being an unjamming portion which comprises a lower supporting surface and two lateral containment walls for said closures that arrive from said unloading region, an unjamming device being provided for moving away the closures jammed at said unjamming portion, said unjamming device comprising sensor means arranged downstream of said unloading region and adapted to detect an interruption of the flow of said closures along said feeding guide and actuation means adapted to move at least one portion of said lower supporting surface in response to a signal emitted by said sensor means to cause the falling by gravity of said jammed closures from said supporting surface.

2. The device according to claim 1, wherein said actuation means comprise first actuation means adapted to move at least one portion of said lower supporting surface, and second actuation means adapted to move at least one portion of at least one lateral containment wall in response to a signal emitted by said sensor means to cause the falling by gravity of said jammed closures from said supporting surface.

3. The device according to claim 1, further comprising an unloading device which comprises movement means configured for moving on command a lower surface of said overturning device, said movement means being adapted to start operating on command following an interruption of a flow of said closures that is not solved by the intervention of said unjamming device.

4. The device according to claim 1, wherein said unjamming portion is arranged directly downstream of said unloading region.

5. The device according to claim 1, further comprising, along an extension of said feeding guide, an inspection station designed to check a conformity of said closures, said inspection station being functionally associated with a device for expelling nonconforming closures.

6. The device according to claim 5, wherein said unjamming portion is arranged between said unloading region and said inspection station.

7. The device according to claim 5, wherein said inspection guide comprises a first guide and a second guide, said inspection station being formed at a transfer star conveyor arranged between said first guide and said second guide.

8. The device according to claim 5, wherein said inspection station comprises a device for lifting the closures which is adapted to retain the lower rim of the lifted closures so as to allow adapted vision and control systems to check the conformity of said closures, said lifting device comprising a star conveyor along which multiple receptacles for respective closures are formed, said receptacles being connected, by means of at least one suction opening, to a vacuum chamber, which is connected to air extraction means, and being associated with a device for expelling nonconforming closures.

9. The device according to claim 1, wherein said actuation means comprise actuator means adapted to cause a movement of said lower supporting surface along a movement direction that is substantially horizontal and perpendicular to the direction of extension of said feeding guide.

10. The device according to claim 1, wherein said actuation means comprise actuator means adapted to cause a tilting motion of said lower supporting surface about a longitudinal edge thereof.

* * * * *